United States Patent Office 3,695,961
Patented Oct. 3, 1972

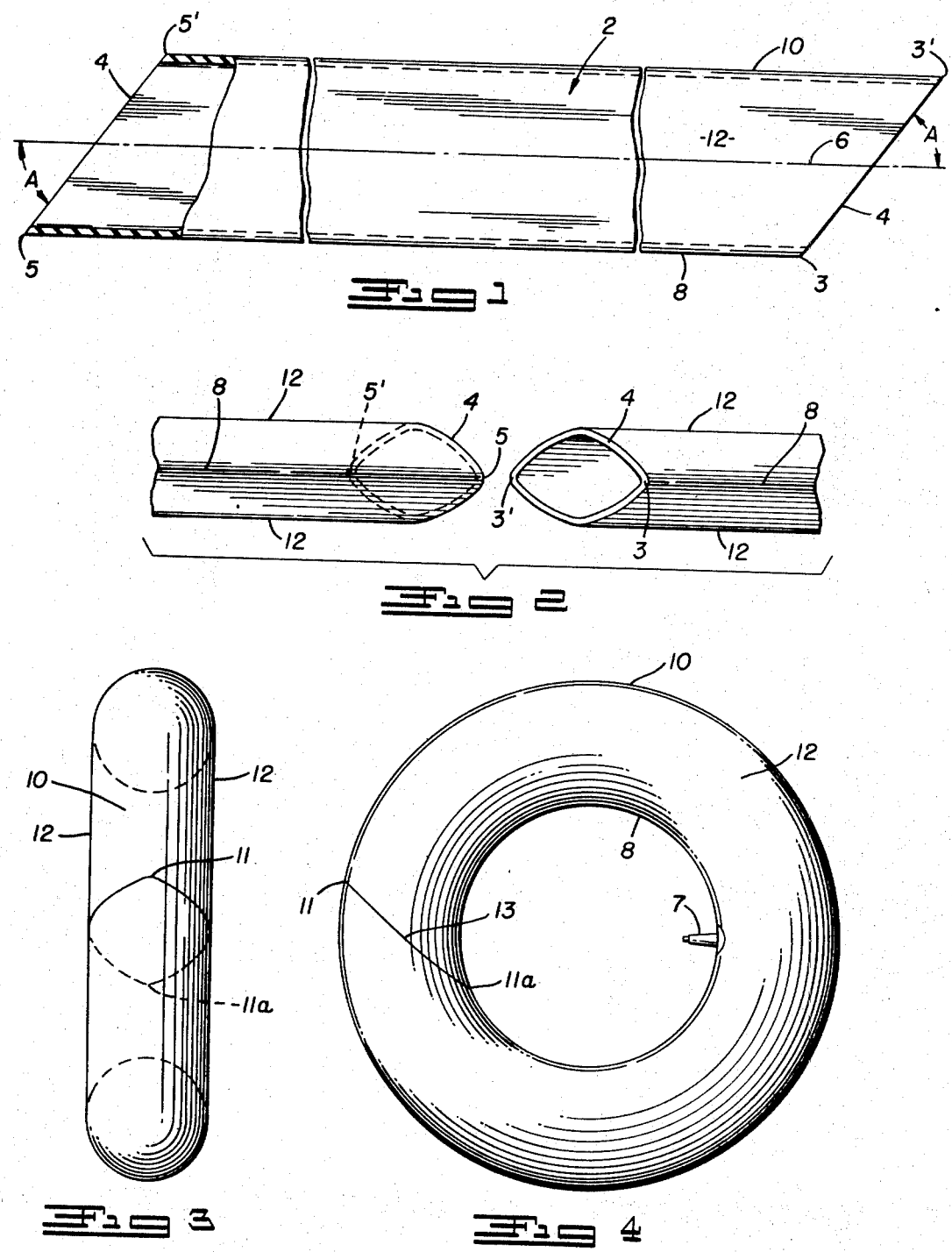

3,695,961
METHOD OF PRODUCING AN IMPROVED INNER TUBE
Paul O. Pfeiffer, Cuyahoga Falls, and Frank J. Grucella, Akron, Ohio, assignors to The General Tire & Rubber Company
Original application Aug. 22, 1967, Ser. No. 662,362, now Patent No. 3,608,603, dated Sept. 28, 1971. Divided and this application Sept. 30, 1970, Ser. No. 76,889
Int. Cl. B29h 15/04
U.S. Cl. 156—122
2 Claims

ABSTRACT OF THE DISCLOSURE

This invention relates to an improved inner tube for radial ply tires in which the ends of the tube, which are to be spliced together, lie at an acute angle with respect to the longitudinal axis of the tube.

BACKGROUND OF THE INVENTION

This application is a division of U.S. Pat. application Ser. No. 662,362 filed Aug. 22, 1967, now U.S. Pat. No. 3,608,603 issued Sept. 28, 1971.

Inner tubes are used in pneumatic tires to prevent the escape of air from within the tire. These tubes are made of suitable elastomeric material which is highly impermeable to the passage of air. Although tubeless tires are very popular today, inner tubes are still in demand for several reasons. One of the primary reasons is that because of certain constructions of many types of rims, it is difficult to effectively seal a tubeless pneumatic tire. Therefore, an inner tube must be used for this purpose.

Inner tubes are typically prepared from a suitable elastomer which is compounded along with additives, curing agents, and the like. The elastomeric material is then extruded into tubular shape. Specific lengths of tubing are cut from this stock to the desired size. The ends of the specific length are brought together and spliced to form a torus. The torus so formed is then inflated and vulcanized. The ends of the specific length of tubing from which the tube is formed are usually cut along lines perpendicular to the longitudinal axis of the tube.

It has been found that tubes made in this way experience a high rate of failure when employed in radial ply tires.

This is because the line of splice lies in a common plane with the radial cords of the tire carcass, i.e., the plane along a radius of the tire. In a radial ply tire the cords of the innermost carcass ply extend from bead to bead radially of the tire, and therefore lie in planes along radii of the tire. Since an inner tube is formed by splicing ends which are cut perpendicular to the longitudinal axis of the tube, the line of juncture will lie in a common plane with a cord or cords of the innermost carcass ply. Since the splice and the cords lie in this common plane, the splice experiences a high degree of chafing due to cord flexing along approximately its entire length.

Recently, it has been discovered that if the splice of the tube can be made to lie at a substantial angle with respect to the cords of the radial ply tire, the above-mentioned high rate of failure may be overcome. Such a discovery has been disclosed in U.S. Pat. application Ser. No. 575,128, filed Aug. 25, 1966, now abandoned, assigned to the same assignee as the present invention. In this application, tubes are formed from a specific length of tubing, which has its ends cut at an acute angle with respect to the longitudinal axis of the tubing. The ends of the length are then brought together and spliced. It has been found that although tubes made in this way significantly decrease the tube failure problem in a radial ply tire, there is still some degree of failure. It has been found that failure most often occurs in the sidewall portions of the tube where the transverse edges of each cut end are joined.

SUMMARY OF THE INVENTION

It is an object of this invention to further reduce the rate of failure of inner tubes utilized in radial ply tires than has heretofore been accomplished.

It is a further object to provide a tube constructed in such a manner as to insure that the most likely points of failure along the tube splice will be in the base and crown portions of the tube.

It is another object to provide an inner tube formed from a piece of tubing with ends cut at an acute angle with respect to its longitudinal axis, wherein the transverse edges of each cut end will be joined in the base and crown portions of the tube.

It is still another object to provide a novel method of producing an inner tube which will satisfactorily perform when used in a radial ply tire.

Inner tubes made according to this invention are cut along spaced, parallel lines which lie at an acute angle to the longitudinal axis of the tube. The cut ends are brought together in such a way that the transverse edges of the cuts at each end of the tube will meet in the base and crown portion. This can be done by rotating the length of tubing 90° about its longitudinal axis, just before the ends are brought together for splicing. In this way, the parallel cuts made will be along lines extending from the base to the crown, rather than along lines from sidewall to sidewall.

BRIEF DESCRIPTION OF THE DRAWINGS

FIG. 1 shows a flat piece of rubber tubing with parts omitted and shown in section, with its ends cut according to the invention.

FIG. 2 shows a partial perspective view of the tube in FIG. 1, rotated 90° about its longitudinal axis, with its ends about to be joined for splicing.

FIG. 3 shows an end view of an inner tube spliced according to the invention.

FIG. 4 shows a side view of the tube of FIG. 3.

PREFERRED EMBODIMENTS OF THE INVENTION

FIG. 1 shows a piece of rubber tubing 2 from which the improved inner tube of the invention is to be formed. The tubing has parallel ends 4, each cut along a line which forms an acute angle $\Delta$ with the longitudinal axis 6 of the tubing. The ends 4 are cut along a line extending from the base 8 to the crown 10, across both sidewall portions 12. The transverse edges 3′, 5′ of the cut ends are located in the crown 10, while the edges 3, 5 are located in the base portion 8. The tube is made of a material highly impermeable to air, such as butyl rubber. However, any suitable elastomeric material may be used which will give the desired degree of impermeability.

After the desired length is cut from tubular stock as shown in FIG. 1, the ends 4 and 6 of the tube are folded around to meet as shown in FIG. 2. Before the ends 4 and 6 are brought together, the specific length of tubing 2 is rotated 90° about its longitudinal axis 6, so that the transverse edges 3, 5 and 3′, 5′ of each cut end will meet in the base portion 8 and crown portion 10, respectively.

The ends, when joined, will form a splice line as shown in FIGS. 3 and 4. In these figures, it can be seen that the sharp, or V-shaped juncture points 11 and 11a of the splice will lie in the crown and base respectively. The lines of the splice across each sidewall portion 12 will be relatively straight. The valve means 7 is inserted whenever practical, usually before splicing. Because the maximum flex of the cords of a radial ply tire occur in the sidewalls, a tube constructed as herein described is less likely to fail at its splice in the sidewall.

The angle at which the ends are cut is preferably between 20° and 75° with respect to the longitudinal axis of the tube. An angle of approximately 25° has been found to be highly satisfactory.

The splicing of the ends may be accomplished by any known splicing procedure. The ends may be butt spliced in a manner similar to that shown in U.S. Pat. 2,675,854. In the alternative, the ends could be lap spliced to obtain the required strength at the juncture of the ends. The splice may also be reinforced along any part, or all of its length by various known procedures. For example, the splice may be reinforced with a single layer of rubber strip, or by reinforcing patches.

The inner tube shown in FIGS. 1 through 4 can be conveniently made by cutting desired length of tubing from a tubular stock using parallel cutter knives spaced from one another so that the distance between them represents the desired length of inner tube. One of the knives is preferably toward or away from the other so that any desired length of tubing may be readily cut. The knives are placed at the desired angle in relation to the longitudinal axis of the tube and the cuts are made. The tube is then rotated 90° about its longitudinal axis, the ends of the tube brought together, spliced, inflated, and vulcanized.

Modifications and variations of the present invention may be made without departing from the spirit and scope of the invention as defined by the claims.

What is claimed is:

1. In the method of producing an inner tube from an extruded stock of rubber tubing which includes the steps of cutting a predetermined length from said tubing by cutting across said tubing along spaced parallel lines lying at a preselected angle between about 20° and about 75° with the longitudinal axis of said tubing, bringing the ends of said length together to form a torus having a base, crown and sidewall portion, splicing said ends together to form a tube and vulcanizing said tube, the improvement comprising rotating said predetermined length of tubing about its longitudinal axis before bringing the ends together so that the transverse ends of the cuts made are located in the base and crown portions of said torus.

2. The improved method defined in claim 1, wherein said predetermined length of tubing is rotated approximately 90° about its longitudinal axis.

References Cited

UNITED STATES PATENTS

| 1,905,365 | 4/1933 | Carlin | 156—120 |
| 2,204,468 | 6/1940 | Berryman | 156—122 X |

FOREIGN PATENTS

| 1,016,772 | 1/1966 | Great Britain | 152—349 |

STEPHEN C. BENTLEY, Primary Examiner